United States Patent [19]

Sugimoto et al.

[11] 4,026,014

[45] May 31, 1977

[54] METHOD OF MAKING CONNECTOR ASSEMBLY FOR PRINTED WIRING BOARD

[75] Inventors: Kazuyasu Sugimoto; Hiroshi Yamaya; Kameki Ishimoto, all of Kadoma, Japan

[73] Assignee: Matsushita Electric Industrial Co., Ltd., Japan

[22] Filed: June 26, 1975

[21] Appl. No.: 590,680

[30] Foreign Application Priority Data

May 19, 1975 Japan ............................ 50-60427

[52] U.S. Cl. .......................... 29/629; 339/176 MP; 339/198 G; 339/198 H; 339/208; 339/210 R

[51] Int. Cl.² ........................................ H02G 15/00

[58] Field of Search ......................... 29/629, 630 R; 339/176 MP, 198 G, 198 H, 206 R, 207 R, 208, 210 R

[56] References Cited

UNITED STATES PATENTS

| | | | |
|---|---|---|---|
| 2,352,654 | 7/1944 | O'Brien | 339/206 R X |
| 3,172,718 | 3/1965 | LaLonde | 339/176 MP |
| 3,281,762 | 10/1966 | Jones | 339/198 G |
| 3,474,388 | 10/1969 | Jackson et al. | 339/92 R |
| 3,553,630 | 1/1971 | Scheingold et al. | 339/176 MP |
| 3,665,370 | 5/1972 | Hartmann | 339/75 MP |
| 3,818,419 | 6/1974 | Crane | 339/74 R |
| 3,858,163 | 12/1974 | Goodman et al. | 339/176 MP |
| 3,899,234 | 8/1975 | Yeager et al. | 339/74 R |
| 3,905,665 | 9/1975 | Lynch et al. | 339/17 L |

*Primary Examiner*—James R. Duzan
*Attorney, Agent, or Firm*—Robert E. Burns; Emmanuel J. Lobato; Bruce L. Adams

[57] ABSTRACT

An improved connector assembly for use with a printed wiring board is provided, composed of at least two segments which are initially separate from each other and which are assembled together with contact elements carried thereon. The contact elements are preferably produced from an initially unitary blank having an excess portion which is removed, upon completion of assemblage of the segments, from these portions of the blank which constitute the contact elements. The connector assembly is compatible with both of single-sided and double-sided printed wiring boards.

8 Claims, 15 Drawing Figures

METHOD OF MAKING CONNECTOR ASSEMBLY FOR PRINTED WIRING BOARD

The present invention relates to a connector assembly for a printed wiring board having electrical contacts printed or otherwise formed on at least one surface of its edge portion. The present invention is also concerned with a method of manufacturing such a connector assembly.

A conventional connector assembly for a printed wiring board comprises a unitary housing structure having a pair of spaced parallel side walls forming therebetween an elongated groove with an open top end and a bottom wall located at the bottom of the elongated groove. Each of the side walls of the housing structure is formed with a plurality of parallel grooves or recesses extending between the upper and lower ends of the inner face thereof while the bottom wall of the housing structure is formed with apertures which are disposed in parallel with the inner faces of the side walls and which are located respectively in alignment with the grooves or recesses in each of the side walls. Elastic electrical contact elements are received, each in part, in the grooves or recesses in at least one of the side walls of the housing structure and have lower portions or limbs projecting outwardly from the bottom wall of the housing structure through the apertures in the bottom wall. The housing structure thus arranged is fixedly mounted on a mother board carrying various circuit components thereon so that the contact elements projecting from the bottom wall of the housing structure are connected to the circuit components on the mother board. When a printed wiring board is inserted into the elongated groove in the housing structure and is held in a predetermined fixed position relative to the housing structure, the contact elements are respectively in pressing contact with the contacts on the printed wiring board by reason of the elasticity of the contact elements so that electrical contact is established between each of the contacts on the printed wiring board and each of the contact elements on the housing structure.

For the assemblage of the connector assembly thus constructed, the contact elements are fitted one by one into the individual grooves or recessed in the side wall or walls and the individual apertures in the bottom wall of the unitary housing structure by manual operation. Not only laborious and time-consuming procedures are therefore required during assemblage but a difficulty is encountered in controlling the quality of the products especially where the products are manufactured on a large-scale commercial basis. The present invention contemplates elimination of these drawbacks inherent in the prior art connector assemblies for printed wiring board.

In accordance with one important aspect of the present invention, there is provided a connector assembly for a printed wiring board comprising a housing structure having a pair of spaced parallel side walls forming therebetween an elongated groove, end walls located at the opposite longitudinal ends of the elongated groove and a bottom wall located at the bottom of the elongated groove and formed with at least one opening arranged substantially in parallel with the inner faces of the side walls, and a plurality of electrical contacts carried on the inner face of at least one of the side walls of the housing structure and having respective portions projecting outwardly from the bottom wall of the housing structure through the opening or openings in the bottom wall, the housing structure being composed of at least two substantially inseparably conjoined segments which are shaped to form therebetween at least one continuous junction contiguous to the elongated groove in the housing structure. In one preferred embodiment of the present invention, the continuous junction extends in longitudinal direction throughout the length of the housing structure and substantially in parallel with the inner faces of the side walls of the housing structure. In this instance, the housing structure may comprise first and second segments having respective inner side edges which are in contact with each other to form the continuous junction therebetween and each of which consists of a longitudinal portion constituting part of the bottom wall and a pair of vertical sections each constituting part of said end walls. The housing structure may further comprise a third segment having an elongated slot substantially parallel to the inner face of the bottom wall and closely receiving therein the combination of the first and second segments. In another preferred embodiment of the present invention, the continuous junction between the above-mentioned at least two segments is substantially parallel with the inner face of the bottom wall of the housing structure. In this instance, the housing structure may consist of a first segment having a lower edge defining the bottom of the elongated groove in the housing structure and a second segment having an upper face forming the inner face of the bottom wall of the housing structure, wherein the lower edge of the first segment and the upper face of the second segment are in contact with each other so as to form therebetween the above-mentioned continuous segment which is substantially parallel with the inner face of the bottom wall.

In accordance with another important aspect of the present invention, there is provided a method of manufacturing a connector assembly for a printed circuit board, comprising the steps of (1) forming at least two separate segments shaped to constitute in combination a housing structure having a pair of spaced parallel side walls forming therebetween an elongated groove with an open top end, and walls located at the opposite longitudinal ends of the elongated groove and a bottom wall located at the bottom of the elongated groove and formed with at least one opening which is arranged substantially in parallel with the inner faces of the side walls, (2) mounting a plurality of electrical contact elements on that face of at least one of the segments which is to form the inner face of at least one of the side walls, (3) positioning the segments relative to each other into the form of the above-mentioned housing structure consisting of the side, end and bottom walls and having the electrical contacts each in part projecting outwardly from the bottom wall of the housing structure through the opening or openings therein, the housing structure having at least one junction formed between the above-mentioned segments, and (4) substantially inseparably conjoining the segments to each other along the above-mentioned at least one junction therebetween. Where the housing structure consists of the first and second segments which form therebetween a continuous junction extending longitudinally of the housing structure and which have the respective inner side edges in contact with each other forming the continuous junction therebetween as in the preferred embodiment previously described, the electrical contact elements may be mounted on the inner face of at least one of the side walls of the housing structure preferably by (1) forming a unitary blank having a plurality of spaced parallel elongated portions shaped to constitute the contact elements and at least one longitudinal strip portion with which the elongated portions are integral in their respective portions to project outwardly from the bottom wall of the housing structure, (2) positioning the blank on at least one of the segments so that the contact elements are each in part carried on that face of the segment which is to form the inner face of the above-mentioned at least one of the side walls with the longitudinal strip portion of the blank located below the longitudinal portion of the side edge of the segment, the blank being securely held in position relative to the segments when the segments are conjoined to each other, and (3) severing the longitudinal strip of the blank from the elongated portions of the blank so that the elongated portions are separate from each other and form the contact elements.

The features and advantages of the connector assembly and the method of manufacturing the connector assembly in accordance with the present invention will become more apparent from the following description taken in conjunction with the accompanying drawings in which like reference numerals and characters designate corresponding members, portions and structures throughout the figures and in which.

Figure 8:
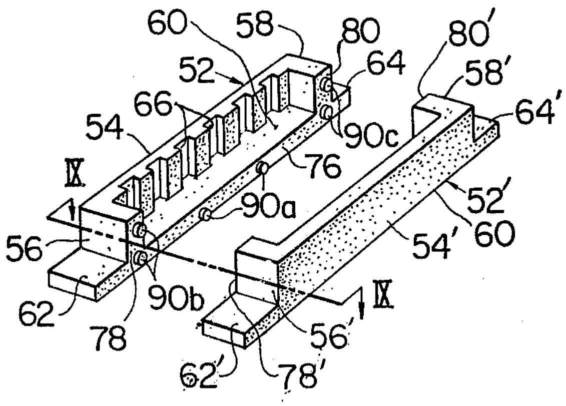
FIG. 8 is an exploded perspective view showing still another modification of the embodiment illustrated in FIGS. 2 and 3.
Figure 9:
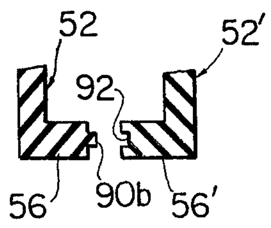
Figure 10:
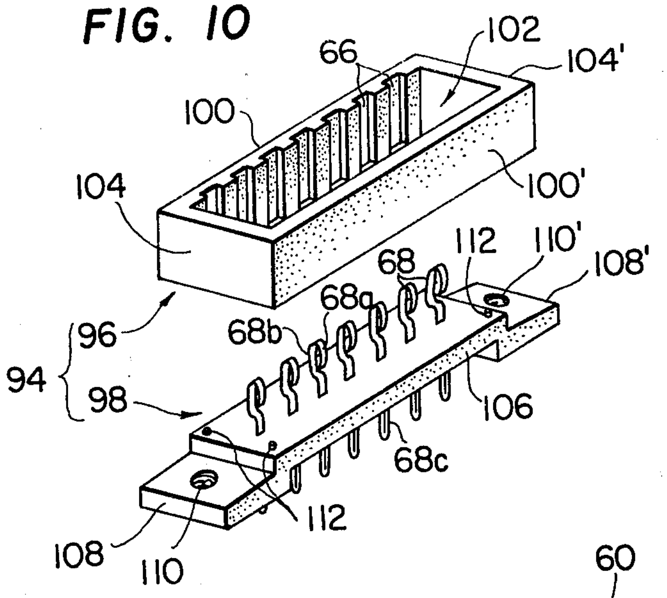
Figure 11:
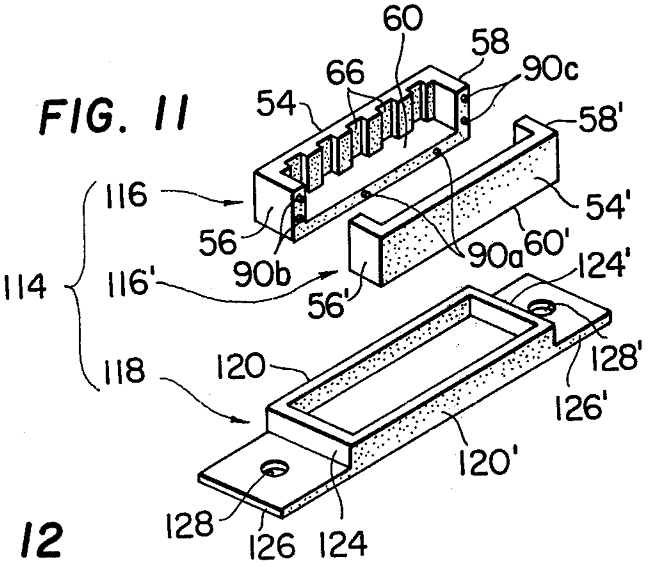
Figure 12:
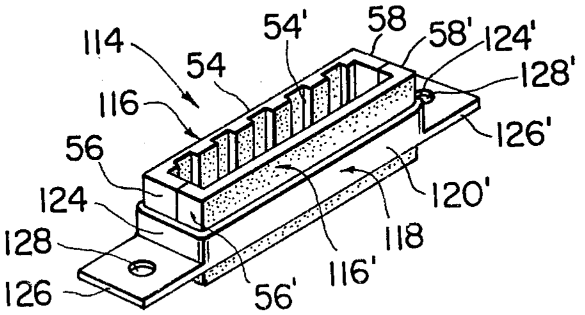
Figure 13:
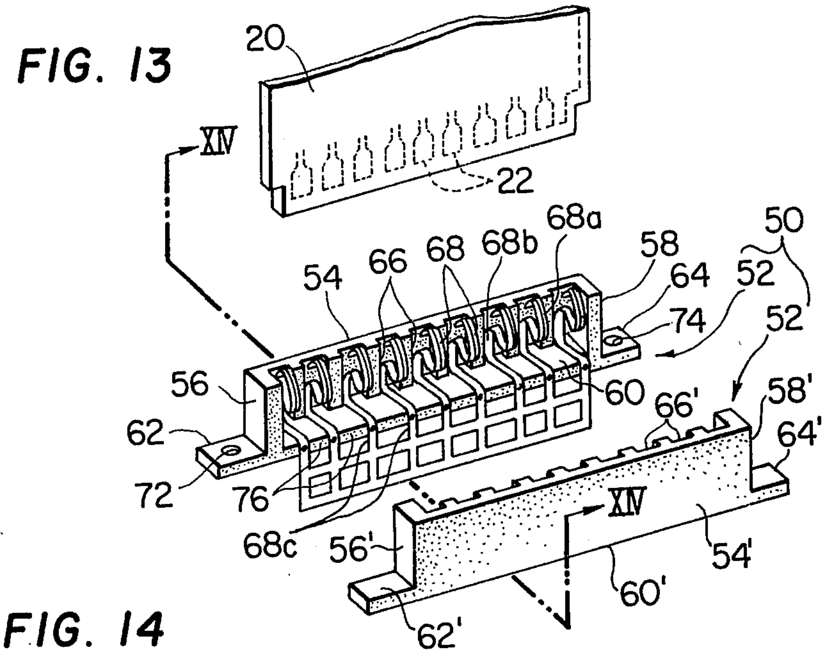
Figure 14:
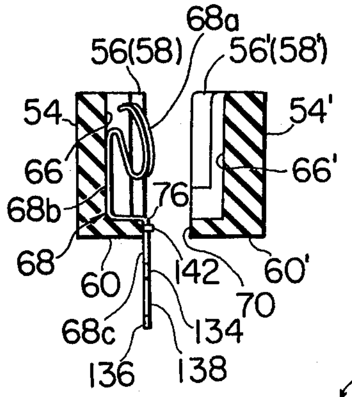

FIG. 9. is a sectional view taken on line IX—IX of FIG. 8;

FIG. 10 is an exploded perspective view showing another preferred embodiment of the connector assembly according to the present invention;

FIG. 11 is an exploded perspective view showing still another preferred embodiment of the connector assembly according to the present invention;

FIG. 12 is a perspective view showing an assembled condition of the embodiment illustrated in FIG. 11;

FIG. 13 is an exploded perspective view showing still another preferred embodiment of the connector assembly according to the present invention;

FIG. 14 is a cross sectional view taken on line XIV—XIV of FIG. 13; and

Figure 15:
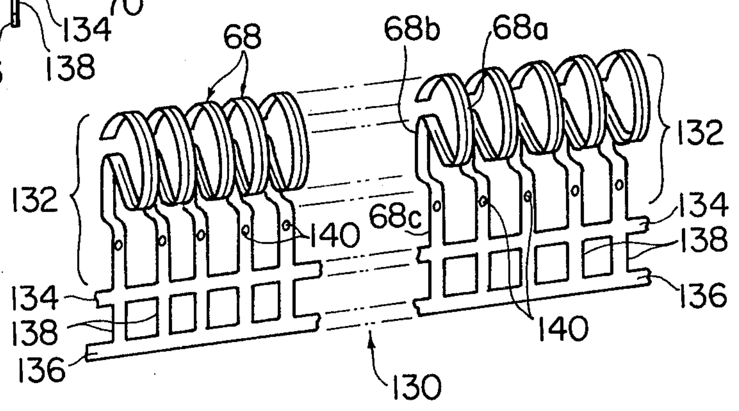

FIG. 15 is a partly cut-away perspective view showing a conductive blank used to form electrical contact elements forming part of the embodiments illustrated in FIGS. 13 and 14.

Figure 1:
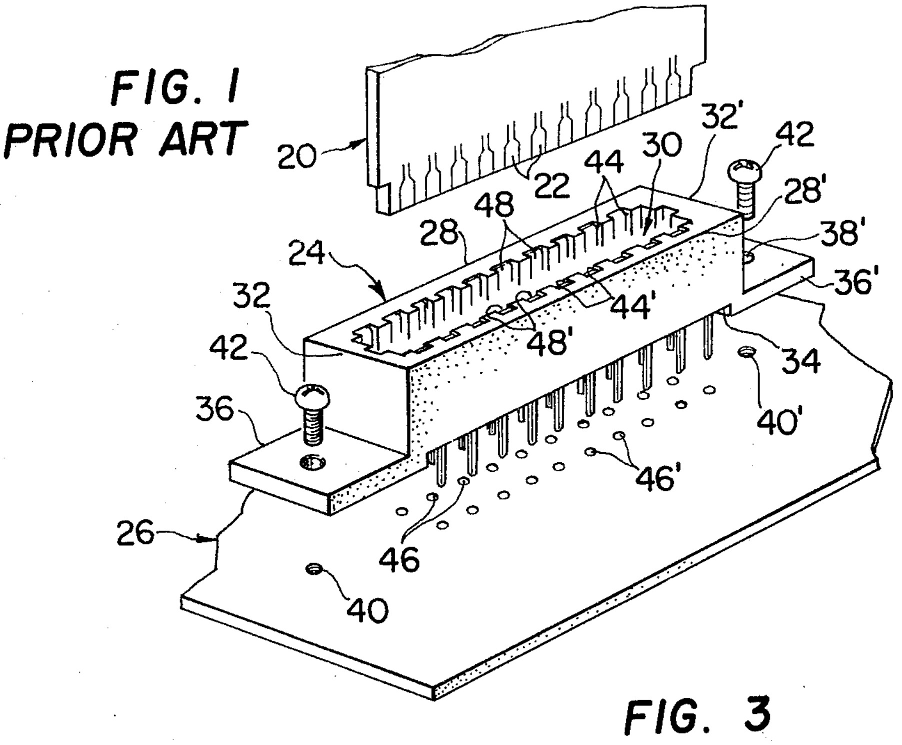
FIG. 1 PRIOR ART
FIG. 1 is a perspective view showing a representative example of a prior art connector assembly for a printed wiring board.

Reference will now be made to the drawings, first to FIG. 1 which illustrates a representative example of a prior art connector assembly to which the present invention appertains. The prior art connector assembly herein shown is assumed to be adapted for use with a double-sided printed wiring board a portion of which is indicated by reference numeral 20. The printed wiring board 20 is, thus, formed with a pattern of a plurality of contacts 22 on each of the surfaces of its edge portion, although the contacts 22 on only one face of the wiring board 20 are seen in FIG. 1. The contacts 22 on each surface of the printed wiring board 20 are usually equidistantly spaced apart from each other. The connector assembly is used for providing electrical connections from these contacts 22 of the printed wiring board 20 to various external circuit components (not shown) of an electric equipment or instrumentation and is largely composed of a unitary housing structure 24 constructed of an electrically insulating material and a mother board 26 which carries thereon a plurality of circuit elements such as leads. The housing structure 24 is made up of a pair of spaced parallel side wall portions 28 and 28′ forming therebetween an elongated groove 30 having an open top end, end walls 32 and 32′ respectively located at the opposite longitudinal ends of the elongated groove 30, a bottom wall portion 34 located at the bottom of the elongated groove 30, and a pair of longitudinal extensions 36 and 36′ which project longitudinally outwardly from the respective lower ends of the end wall portions 32 and 32′, respectively. The longitudinal extensions 36 and 36′ are formed with screw receiving holes 38 and 38′, respectively. On the other hand, the mother board 26 is formed with screw holes 40 and 40′ which are located to be in alignment with the screw holes 38 and 38′, respectively, when the housing structure 24 and the mother board 26 are held in predetermined positions relative to each other. The housing structure 24 is fixedly mounted on one face of the mother board 26 by means of screws 42 and 42′ which are respectively passed through the screw holes 38 and 38′ in the extensions 36 and 36′ of the housing structure 24 and through the screw holes 40 and 40′ in the mother board 26.

The side wall portions 28 and 28′ of the housing structure 24 are formed with vertical grooves or recesses 44 and 44′, respectively, which extend between the upper and lower ends of the respective inner faces of the side wall portions 28 and 28′. The vertical grooves or recesses 44 and 44′ are located respectively in alignment with the contacts 22 on the opposite surfaces of the printed wiring board 20. The bottom wall portion 34 is formed with a longitudinal slot extending in parallel with the inner faces of the side wall portions 28 and 28′ or a plurality of apertures located laterally in alignment with the grooves or recesses 44 and 44′ in the side wall portions 28 and 28′, though not shown in FIG. 1. Likewise, the mother board 26 is formed with apertures 46 and 46′ which are disposed in arrays parallel with the longitudinal slot in the bottom wall portion 34 of the housing structure 24 or respectively in alignment with the apertures in the bottom wall portion 34 as the case may be. In the illustration of FIG. 1, it is assumed that the apertures 46 disposed in one array in the mother board 26 are respectively laterally aligned with the vertical grooves or recesses 44 on the inner face of one side wall portion 28 of the housing structure 24 and the apertures 46' disposed in another array in the mother board 26 are respectively laterally aligned with the vertical grooves or recesses 44' in the other side wall 28' of the housing structure 24. Pluralities of elastic electrical contact elements 48 and 48' have respective upper portions fixedly received in the vertical grooves or recesses 44 and 44', respectively, and respective lower portions or limbs projecting outwardly from the bottom wall 34 of the housing structure 24 through the longitudinal slot or apertures (not shown) formed in the bottom wall portion 34 of the housing structure 24. When the housing structure 24 and the mother board 26 are assembled together, the limbs or lower portions of the individual contact elements 48 and 48' projecting from the outer face of the bottom wall portion 34 of the housing structure 24 are passed through the apertures 46 and 46', respectively, in the mother board 26 and thus project downwardly from the lower face of the mother board 26 for connection to the circuit elements carried on the mother board.

The printed wiring board 20 is press fitted into the elongated groove 30 in the housing structure 24 and is thus elastically gripped between the two sets of contact elements 48 and 48' on the inner faces of the side wall portions 28 and 28' of the housing structure 24 so that the contact elements 48 and 48' are in pressing engagement with the contact-carrying edge portion of the printed wiring board 26, establishing electrical connection between each of the contact elements 48 and 48' on the housing structure 24 and each of the contacts 22 on the printed wiring board 26.

To have the contact elements 48 and 48' mounted on the housing structure 24 during assemblage of the connector assembly thus constructed, it is necessary to have the contact elements 48 and 48' retained one by one to the inner faces of the side wall portions 28 and 28' of the housing structure 24 with the upper portions of the contact elements 48 and 48' fitted into the individual vertical grooves or recesses 44 and 44' in the side wall portions 28 and 28' by manual operation. If the bottom wall portion 34 of the housing structure 24 is formed with the apertures to pass the contact elements therethrough as previously mentioned, it is further necessary to have the contact elements inserted through such apertures also by manual operation so that the lower portions or limbs of the contact elements project downwardly from the underside of the bottom wall portion 34 of the housing structure 24 for alignment with the apertures 46 and 46' in the mother board 26. As previously pointed out, such manual operations require laborious and time-consuming steps and result in difficulty of controlling the performance quality of the connector assemblies manufactured on a large-scaled commercial basis. The embodiments of the connector assembly according to the present invention as hereinafter described with reference to FIGS. 2 to 15 are cleared of these drawbacks of the prior art connector assembly. The connector assembly according to the present invention is thus characterized, among other things, by the simplicity of operation to manufacture the connector assembly and by the adaptability to production on a large-scale commercial basis because of the ease of quality control.

While each of the embodiments of the connector assembly according to the present invention as hereinafter described will be assumed to be adapted for use with a single-sided printed wiring board having a printed conductive pattern on only one of its faces, it should be borne in mind that the essential features of each of the embodiments can be applied, either without modification or with a minor modification, to a connector assembly for use with a double-sided printed wiring board having a pattern of printed contacts on each of its surfaces.

Figure 3:
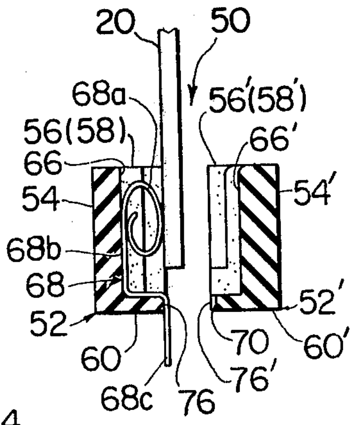
FIG. 3 is a cross sectional view taken on line III—III of FIG. 2.
Figure 2:
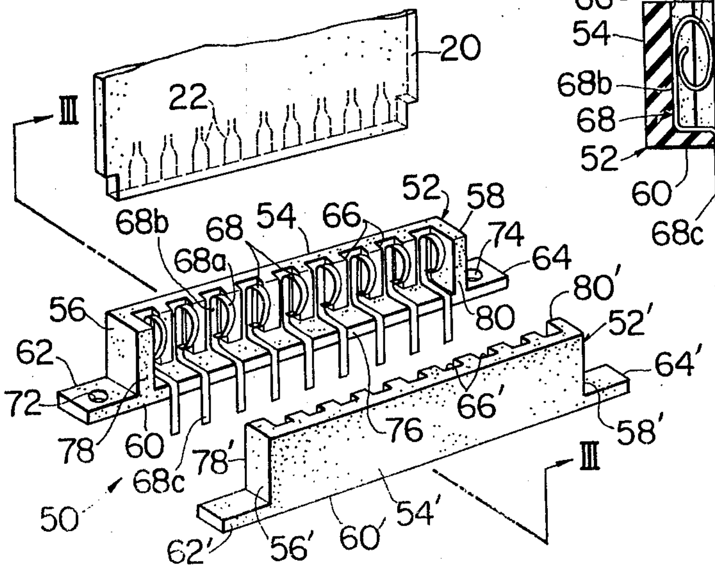
FIG. 2 is an exploded perspective view showing a preferred embodiment of the connector assembly according to the present invention.

Referring to FIGS. 2 and 3, a first preferred embodiment of the connector assembly according to the present invention comprises a two-piece housing structure 50 which is composed of first and second longitudinal segments 52 and 52' which are initially separate from each other. The first longitudinal segment 52 has a side wall portion 54, end wall portions 56 and 58 located at the opposite longitudinal ends of the side wall portion 54, and a bottom wall portion 60 having a pair of longitudinal extensions 62 and 64 projecting in opposite directions to each other from the end wall portions 56 and 58, respectively. The second longitudinal segment 52' is shaped essentially similarly to the first longitudinal segment 52 and is thus made up of a side wall portion 54', end wall portions 56' and 58', and a bottom wall portion 60' having longitudinal extensions 62' and 64' projecting in opposite directions from the end wall portions 56' and 58', respectively. The side wall portions 54 and 54' of the first and second longitudinal segments 52 and 52' are formed with pluralities of vertical grooves or recesses 66 and 66', respectively, which extend between the upper and lower ends of the respective inner faces of the side wall portions 54 and 54' and which are substantially normal to the respective inner faces of the bottom wall portions 60 and 60' of the segments 52 and 52', respectively. A plurality of elastic electrical contact elements 68 are respectively received, each in part, in the vertical grooves or recesses 66 in the side wall portion 54 of the first longitudinal segment 52. Each of the contact elements 68 has a turned upper portion **68*a* spaced apart from the inner face of the side wall portion 54, an intermediate portion 68*b* received on the inner face of the bottom wall portion 60, and a lower end portion or limb 68*c* projecting downwardly from the longitudinal edge of the bottom wall portion 60, as shown. On the other hand, the second longitudinal segment 52' has formed in the longitudinal edge of its bottom wall portion 60' either a longitudinal recess or a number of recesses as indicated at 70 in FIG. 3, the recesses being located to be respectively in alignment with the vertical grooves or recesses 66 in the first longitudinal segment 52. The longitudinal extensions 62 and 64 of the bottom wall portion 60 of the first longitudinal segment 52 are formed with screw holes 72 and 74, respectively, through which the housing structure 50 to be constructed of the two longitudinal segments 52 and 52' is to be fixedly secured to a mother board (not shown) as previously discussed with reference to FIG. 1. The vertical grooves or recesses 66' in the side wall portion 54' of the second longitudinal segment 52' are provided for the purpose that the connector assembly comprising the housing structure 50 may be used not only with a single-sided printed wiring board but a double-sided wiring board and that the connector assembly may be manufactured on a large-scaled standardized commercial basis. The side wall portion 54' of the second longitudinal segment 52' may therefore be left plain, viz., void of the vertical grooves or recesses 66'** where such considerations are not important.

The first and second longitudinal segments 52 and 52' thus shaped have respective inner side edges consisting of longitudinal sections 76 and 76' constituting the respective inner longitudinal edges of the bottom wall portions 60 and 60', first vertical sections 78 and 78' constituting the respective inner vertical edges of the end wall portions 56 and 56', and second vertical sections 80 and 80' constituting the respective inner vertical edges of the end wall portions 58 and 58', respectively. When the first and second longitudinal segments 52 and 52' are fitted to each other with the contact elements 68 carried on the first longitudinal segment 52, the sections 76, 78 and 80 of the inner side edge of the first longitudinal segment 52 are brought into contact with the sections 76', 78' and 80', respectively, of the inner side edge of the second longitudinal section 52' with the lower portions or limbs 68*c* of the contact elements 68 projecting downwardly from the longitudinal recess or spaced recesses 70 in the longitudinal section 76' of the side edge of the second longitudinal segment 52'. The segments 52 and 52' thus fitted to each other are inseparably conjoined or united by bonding the respective inner side edges of the segments together with a chemical adhesive or by ultrasonic welding. The housing structure 50 thus constructed has, though not shown in the drawings, a pair of spaced parallel side walls resulting respectively from the side wall portions 54 and 54' and forming therebetween an elongated groove with an open top end, an end wall resulting from the end wall portions 56 and 56' and having a junction between the first vertical sections 78 and 78' of the respective inner side edges of the segments 52 and 52', an end wall resulting from the end wall portions 58 and 58' and having a junction between the second vertical sections 80 and 80' of the respective inner side edges of the segments 58 and 58', and a bottom wall resulting from the respective bottom wall portions 60 and 60' and having a continuous junction between the longitudinal sections 76 and 76' of the respective inner side edges of the segments 52 and 52'. When the printed wiring board 20, which is assumed to carry the contacts 22 on only one of its surfaces, is inserted into the elongated groove in the housing structure and is brought into a predetermined fixed position relative to the housing structure 50, the individual contact elements 68 received each in part in the vertical grooves or recesses 66 in the side wall 54 of the first longitudinal segment 52 have their upper turned portions 68*a* respectively in contact with the contacts 22 on the printed wiring board 20, which is consequently forced against the inner face of the side wall 54' of the second longitudinal segment 52'. Electrical connection is thus provided between each of the contacts 22 on the single-sided printed wiring board 20 and each of the contact elements 66 on the housing structure 50. The housing structure 50 is then fixedly mounted on a mother board by means of screws passed through the screw holes 72 and 74 in the extensions 62 and 64, respectively, of the first longitudinal segment 52 so that the lower portions or limbs 68*c* of the contact elements 68 project outwardly from the underside of the mother board.

The inner side edges of the segments 52 and 52' constituting the housing structure 50 of the embodiment shown in FIGS. 2 and 3 have been assumed to have flat faces to form a butt joint therebetween in the housing structure. If desired, however, the inner side edges of the segments 52 and 52' may be shaped otherwise so as to enable the segments to be fitted to each other more securely, examples of such an arrangement being illustrated in FIGS. 4 to 9. Each of the embodiments illustrated in FIGS. 4 to 9 is a modification of the embodiment thus far described with reference to FIGS. 2 and 3 and, thus, comprises a two-piece housing structure 50 comprising first and second longitudinal segments 52 and 52' which are shaped essentially similarly to their counterparts of the embodiment shown in FIGS. 2 and 3.

Figure 4:
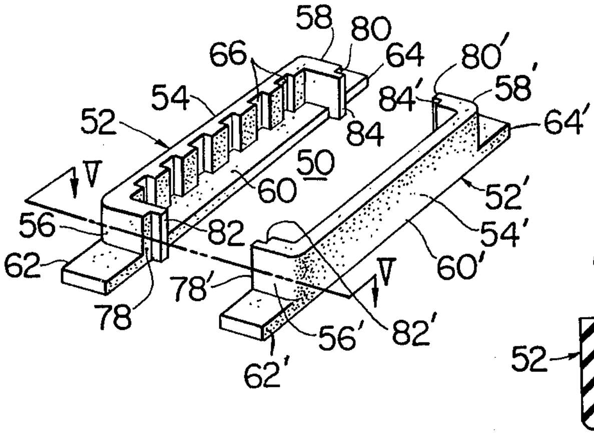
FIG. 4 is an exploded perspective view showing a modification of the embodiment illustrated in FIGS. 2 and 3.
Figure 5:
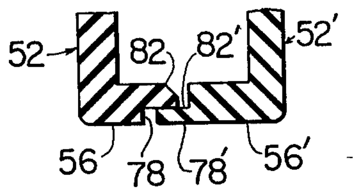
FIG. 5 is a sectional view taken on line V—V of FIG. 4.

The embodiment shown in FIGS. 4 and 5 are distinct over the embodiment of FIGS. 2 and 3 in that the first vertical sections 78 and 78' and the second vertical sections 80 and 80' of the respective inner side edges of the longitudinal segments 52 and 52' are shaped in such a manner as to form therebetween straight halved joints in the end walls of the housing structure 50 constructed of the segments 52 and 52'. More specifically, one of the first and second longitudinal segments, herein shown as being the first segment 52, is formed with lateral projections 82 and 84 on the first and second vertical sections 78 and 80 of the inner side edge of the segment, viz., on the inner vertical edges of the end wall portions 56 and 58, respectively, of the segment 52 and the other of the first and second longitudinal segments, viz., the second segment 52' as assumed in this context, is formed with lateral recesses 82' and 84'in the first and second vertical sections 78' and 80' of the inner side edge of the segment 52', viz., in the vertical edges of the end walls 56' and 58', respectively, of the segment 52'. When the first and second longitudinal segments 52 and 52' are assembled together in a manner essentially similar to that previously described with reference to FIGS. 2 and 3, the outwardly stepped vertical edges 78 and 80 of the end wall portions 56 and 58 of the first longitudinal segment 52 are respectively in mating engagement with the inwardly stepped vertical edges 78' and 80' of the end wall portions 56' and 58' of the second longitudinal segment 52' and, thus, form a straight halved joint in each of the end walls of the housing structure 50 constructed of the segments 52 and 52'. The configurations of the vertical edges of the end wall portions of the segments 52 and 52' shown in FIGS. 4 and 5 are merely by way of example and may therefore be modified in numerous manners if, at all, the edges of the end wall portions be joined together are stepped in directions opposite to each other in the longitudinal directions of the segments 52 and 52' and are adapted to form a straight halved joint in each of the end walls of the housing structure constructed of the segments.

Figure 6:
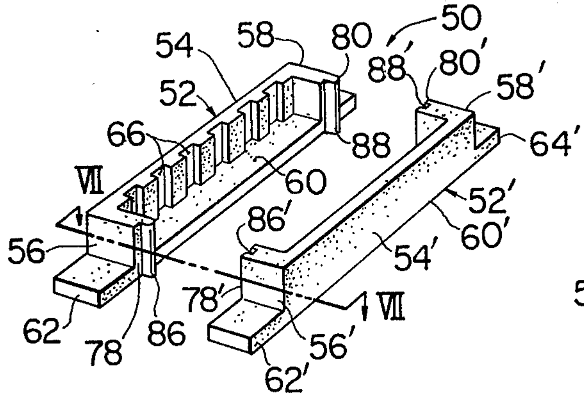
FIG. 6 is an exploded perspective view showing another modification of the embodiment illustrated in FIGS. 2 and 3.
Figure 7:
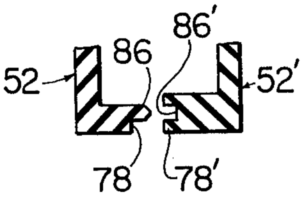
FIG. 7 is a sectional view taken on line VII—VII of FIG. 6.

Turning to FIGS. 6 and 7, the end wall portions 56 and 58 of the first longitudinal segment 52 and the end wall portions 56' and 58' of the second longitudinal segment 52' are shaped in such a manner as to form a forked-mortice-and-tenon joint in each of the end walls of the housing structure 50 to be constructed of the segments 52 and 52'. One of the first and second longitudinal segments, herein assumed as being the first longitudinal segment 52 as shown, has protrusions or tenons 86 and 88 on the first and second vertical sections 78 and 80 of the inner side edge of the segment, viz., on the inner vertical edges of the end wall portions 56 and 58, respectively, of the segment 52 and the other of the first and second segments, viz., the second segment 52' as herein assumed, has grooves or mortices 86' and 88' in the first and second vertical sections 78' and 80' of the inner side edge of the segment 52', viz., in the inner vertical edges of the end wall portions 56' and 58', respectively, of the segment 52'. When the first and second longitudinal segments 52 and 52' thus configured are assembled together in a manner essentially similar to that previously described with reference to FIGS. 2 and 3, the protruded or tenoned vertical edges 78 and 80 of the end wall portions 56 and 58 of the first longitudinal segment 52 are respectively in mating engagement with the mortised vertical edges 78' and 80' of the end wall portions 56' and 58' of the second longitudinal segments 52 and 52' with each of the protrusions or tenons 86 and 88 closely received in the grooves or mortices 86' and 88', respectively, thereby forming a forked-mortice-and-tenon joint in each of the end walls of the housing structure 50 constructed of the two segments 52 and 52' though not shown in the drawings.

The configurations thus far described and shown in FIGS. 6 and 7 are merely by way of example and may therefore be modified, if desired, in numerous manners insofar as one of the end wall portions 56 and 56' or 58 and 58' is formed with a protrusion or tenon and the other of the end wall portions is formed with a groove or mortice adapted to receive therein the above-mentioned protrusion so as to form a forked-mortice-and-tenon joint in each of the end walls of the resultant housing structure.

FIGS. 8 and 9 illustrate an arrangement in which the first and second longitudinal segments 52 and 52' are conjoined together by means of a plurality of projections formed on the inner side edge of one of the segments 52 and 52' and recessed formed in the inner side edge of the other of the segments 52 and 52'. In FIGS. 8 and 9, such projections are assumed to consist of projections 90*a* on the longitudinal section 76, projections 90*b* on the first vertical section 78 and projections 90*c* on the second vertical section 80 of the inner side edge of the first longitudinal segment 52. In other words, the projections 90*a* are formed on the inner side edge of the bottom wall portion 60 of the first longitudinal segment 52, whilst the projections 90*b* and 90*c* are formed on the respective inner vertical edges of the end wall portions 56 and 58, respectively, of the segment 52. Though not seen in FIG. 8, the second longitudinal segment 52' has formed in the inner side edge thereof a plurality of recesses which are located respectively conformingly to the above-mentioned projections 90*a*, 90*b* and 90*c* on the inner side edge of the first longitudinal segment 52. In FIG. 9, one of such recesses is designated by reference numeral 92, the recess 92 being assumed to be formed in the inner vertical edge 78' of the end wall portion 56' of the second longitudinal segment 52' and accordingly located to be laterally in alignment with one of the projections 90*a* on the inner vertical edge 78 of the end wall portion 56 of the first longitudinal segment 52. When the first and second longitudinal segments 52 and 52' are conjoined together as in the manner described with reference to FIGS. 2 and 3, the projections 90*a*, 90*b* and 90*c* of the first longitudinal segment 52 are respectively fitted into the recesses in the second longitudinal segment 52' and hold the segments 52 and 52' in fixed positions relative to each other.

The configurations shown in FIGS. 8 and 9 are also subject to modification if desired. For example, the projections and recesses may be formed in the second and first longitudinal segments 52' and 52, respectively, conversely to the configurations shown in FIGS. 8 and 9. As an alternative, the projections may be formed on both of the first and second longitudinal segments 52 and 52' with the corresponding recesses formed also in the two segments.

The combinations of the projections or protrusions and the recesses or grooves as provided in each of the embodiments thus far described with reference to FIGS. 4 to 9 are conducive not only to securely retaining the first and second segments 52 and 52' to each other but to easily and accurately positioning the segments relative to each other and will therefore contribute to raising the production efficiency of the connector assembly provided by the present invention.

FIG. 10 illustrates still another preferred embodiment of the connector assembly according to the present invention. While the housing structure in each of the embodiment thus far described with reference to FIGS. 2 to 9 is made up of the segments which are initially separate from each other in the longitudinal direction of the housing structure, the embodiment illustrated in FIG. 10 is characterized by a two-piece housing structure 94 which is composed of first and second or upper and lower segments 96 and 98 which are initially separate from each other with a continuous junction formed therebetween on a plane substantially parallel with the bottom of the housing structure. As illustrated in FIG. 10, the first or upper segment 96 has a pair of spaced parallel side wall portions 100 and 100' forming therebetween an elongated slot 102 and end wall portions 104 and 104' which are located at the opposite longitudinal ends of the elongated slot 102. One of the side wall portions, herein assumed to be the side wall portion 100 as shown, is formed with a plurality of spaced parallel vertical grooves or recesses 66 extending between the upper and lower ends of the inner face of the side wall portion 100. If the connector assembly is to be used with a double-sided printed wiring board or if the connector assembly is manufactured on a standardized commercial basis, similar grooves or recesses may also be formed in the other of the side wall portions 100 and 100'. On the other hand, the second or lower segment 98 has a flat elongated wall portion 106 which is substantially coextensive with the lower end of the first or upper segment 96 and which is formed with a number of apertures (not numbered) arranged in parallel with the side edges of the wall portion 106. The apertures thus formed in the elongated wall portion 106 are respectively in alignment with the vertical grooves or recesses 66 in the side wall portion 100 of the first or upper segment 96 and are adapted to pass therethrough the lower portions or limbs of electrical contact elements 68 as will be described later. The elongated wall portion 106 of the second or lower segment 98 has a pair of longitudinal extensions 108 and 108' which project longitudinally outwardly from the longitudinal ends of the elongated wall portion 106. The extensions 108 and 108' are formed with screw holes 110 and 110', respectively, through which the second or lower segment 98 is to be fixedly mounted together with the first or upper segment 96 on a mother board (not shown) by means of screws as in the prior art connected assembly shown in FIG. 1.

The first and second or upper and lower segments 96 and 98 thus configured are conjoined together by bonding the lower edges of the side and end wall portions 100, 100', 104 and 104' of the first or upper segment 96 to the upper face of the flat elongated wall portion 106 of the second or lower segment 98 by means of an adhesive or by an ultrasonic welding process. In this instance, the contact elements 68 may be mounted on the combination of the segments 96 and 98 in two methods. In one method, the contact elements 68 are mounted on the second or lower segment 98 before the segment 98 is fitted to the first or upper segment 96 so that each of the contact elements 68 has its turned upper end portion 68*a* and intermediate portion 68*b* extending over the upper face of the flat elongated wall portion 106 and its lower portion or limb 68*c* projecting downwardly from the lower face of the elongated wall portion 106 as seen in FIG. 10. The second or lower segment 98 is then fitted to the first or upper segment 96 together with the contact elements 68 so that the intermediate portions 68*b* of the individual connector elements 68 supported by the flat elongated wall portion 106 of the former segment are respectively received in the vertical grooves or recesses 66 in the side wall portion 100 of the latter segment. In the other method, the first and second segments 96 and 98 are first joined together without the contact elements 68 supported thereon and then the contact elements are mounted on the combination of the two segments 96 and 98 in such a manner that the respective intermediate portions 68*b* of the contact elements 68 are received in the vertical grooves or recesses 68 in the side wall portion 100 of the first segment 96 and the respective lower portions or limbs 68*c* of the contact elements 68 are passed through the apertures in the flat elongated portion 106 of the second segment 98 and project downwardly from the lower face of the elongated wall portion 106 of the segment 98. Though not shown in the drawings, the housing structure 94 thus constructed of the first and second segments 96 and 98 has a pair of spaced parallel side walls resulting respectively from the side wall portions 100 and 100' of the first segment 96, end walls resulting respectively from the end wall portions 104 and 104' of the first segment 96, and a bottom wall resulting from the flat elongated wall portion 106 of the second segment 98 and having an inner face constituted by the upper face of the elongated wall portion 106. When a printed wiring board (not shown) is inserted into the elongated groove 102 in the housing structure 94 thus constructed and is held in a predetermined fixed position relative to the housing structure 94, the contact-carrying edge portion of the printed wiring board is pressed upon between the inner face of the side wall portion 100' of the first or upper segment 96 and the turned upper end portions 68*a* of the contact elements 68 received on the inner face of the side wall portion 100 of the segment 96. Electrical connection is thus provided between each of the contact elements 68 and each of the contacts on the printed wiring board. The housing structure 94 is then mounted on a mother board by means of screws which are passed through the screw holes 110 and 110' in the extensions 108 and 108' of the second or lower segment 98 so that the contacts on the printed wiring board are electrically connected to the circuit elements on the mother board through the electrical contacts 68 having their respective lower portions or limbs projecting downwardly from the underside of the mother board, though not shown.

In order to enable the first and second segments 96 and 98 to be more securely joined together and to facilitate accurately positioning the segments 96 and 98 relative to each other, the first or upper segment 96 is formed with a plurality of recesses (not shown) in the lower edges of its end wall portions 104 and 104' and the second or lower segment 98 is, in turn, formed with projections 112 on the upper face of its elongated wall portion 106 as shown. The projections 112 are located to be respectively in alignment with the recesses in the lower edges of the end wall portions 114 and 114' of the first segment 96 and are thus closely fitted into the recesses when the first and second segments 96 and 98 are conjoined together. If desired, the recesses may be formed in the lower edges of the side wall portions 100 and 100' of the first or upper segment 96 with the projections on the elongated wall portion 106 of the second or lower segment 98 located conformingly to such recesses. As an alternative, the projections may be formed on the first or upper segment 96 and the recesses formed in the second or lower segment 98.

FIGS. 11 and 12 illustrate still another preferred embodiment of the connector assembly according to the present invention. The connector assembly comprises a three-piece housing structure 114 consisting of first and second longitudinally separate segments 116 and 116' and a third segment 118. The first and second longitudinally separate segments 116 and 116' are configured essentially similarly to the longitudinal segments 52 and 52' of the embodiment shown in FIGS. 8 and 9 except that the segments 116 and 116' are void of the longitudinal extensions 62, 62', 64 and 64' of the segments 52 and 52' of the housing structure shown in FIGS. 8 and 9. The portions of the first and second segments 116 and 116' of the embodiment shown in FIGS. 11 and 12 are thus designated by the same reference numerals and characters as those of the segments 52 and 52' of the housing structure shown in FIGS. 8 and 9. The third segment 118 of the embodiment shown in FIGS. 11 and 12 is constructed of a pair of spaced parallel side wall portions 120 and 120' forming therebetween an elongated slot 122, and end wall portions 124 and 124' located at the opposite longitudinal ends of the elongated slot 122. The side wall portions 120 and 120' are spaced apart a distance substantially equal to the total width of the combination of the first and second segments 116 and 116' and the end wall portions 124 and 124' are spaced apart a distance substantially equal to the length of the first and second segments 116 and 116' so that the elongated slot 122 defined by the inner faces of the side wall portions 120 and 120' and the end wall portions 124 and 124' of the third segment 118 is substantially identical with the section of the combination of the first and second segments 116 and 116' on a plane parallel with the coplanar upper faces of the bottom walls 60 and 60' of the segments 116 and 116'. The third segment 118 has a pair of longitudinal extensions 126 and 126' projecting in opposite directions from the longitudinal end wall portions 124 and 124' of the third segment 118. The longitudinal extensions 126 and 126' are formed with screw holes 128 and 128', respectively.

The first and second segments 116 and 116' are conjoined together so that the respective inner side edges thereof are in contact with each other with the projections 90*a*, 90*b* and 90*c* on the inner side edge of the first segment 116 fitted into the recesses (not shown) in the inner side edge of the second segment 116' as previously described with reference to FIGS. 8 and 9. The combination of the first and second segments 116 and 116' thus conjoined is then inserted into the elongated slot 122 in the third segment 118 in such a manner that the subassembly of the first and second segments 116 and 116' has its lower portion projecting downwardly from the lower end of the third segment 118 and that the inner faces of the side wall portions 120 and 120' and the end wall portions 124 and 124' of the third segment 118 are respectively in close contact with the outer faces of the side walls 54 and 54' and the end walls 56, 58, 56' and 58' of the first and second segments 116 and 116', as illustrated in FIG. 12. The first, second and third segments 116, 116' and 118 may be bonded to each other by an adhesive or by means of ultrasonic welding. Because, however, of the sufficiently close engagement between the segments 116, 116' and 118, especially the first and second segments 116 and 116' which are firmly gripped by the third segment 118, the segments 116, 116' and 118' or at least the segments 116 and 116' may be left split from each other without bonding them together. Contact elements (not shown) may be mounted on either the subassembly of the first and second segments before the subassembly is fitted to the third segment 118 or on the combination of the first and second segments 116 and 116' which have been assembled to the third segment 118. The housing structure 114 thus complete with the contact elements is mounted on a mother board by means of screws which are passed through the screw holes 128 and 128' in the longitudinal extensions 126 and 126' of the third segment 118, though not shown in the drawings.

FIGS. 13 to 15 illustrate still another preferred embodiment of the connector assembly according to the present invention. The connector assembly herein shown has a housing structure which is constructed and arranged essentially similarly to the housing structure 50 in the embodiment of FIGS. 2 and 3 and which is therefore designated in its entirety by reference numeral 50. The housing structure 50 shown in FIGS. 13 and 14 is thus composed of a first segment 52 consisting of a side wall 54 formed with vertical grooves or recesses 66, end walls 56 and 58 having respective longitudinal extensions 62 and 64 and a bottom wall 60, and a second segment 52' consisting of a side wall 54' formed with vertical grooves or recesses 66', end walls 56' and 58' having respective longitudinal extensions 62' and 64' and a bottom wall 60'. The embodiment shown in FIGS. 13 to 15 is characterized from the embodiment of FIG. 2 and 3 by the method in which the contact elements are produced and mounted on the housing structure 50 thus constructed. While the elastic electrical contact elements 68 forming part of the connector assembly shown in FIGS. 2 and 3 have been assumed to be initially formed as separate members, the embodiment shown in FIGS. 13 to 15 uses electrical contact elements 68 which are produced from a unitary blank 130 of elastic and electrically conductive metal. As will be best seen from FIG. 15, the unitary blank 130 of the elastic conductive metal is composed of a number of spaced parallel elongated portions 132, a first longitudinal strip portion 134 extending at right angles to the elongated portions 132 and integrally joining the lower ends of the elongated portions 132 together, and a second longitudinal portion 136 extending in parallel with the first longitudinal strip portion 134 and integrally joint to the first longitudinal strip portion 134 by a number of spaced parallel strip portions 138 respectively extending in line with the elongated portions 132. The elongated portions 132 are shaped to constitute the contact elements 68 having the previously described configurations each having a turned upper end portion 68*a*, a substantially straight intermediate portion 68*b* and a substantially straight lower portion or limb 68*c*. The blank 130 is preferably formed with an aperture 140 in the lower end portion or limb 68*c* of each of the elongated portions 132 and, consonantly therewith, the side wall 54 of the first longitudinal segment 52 has formed on the inner side edge 76 of its bottom wall 60 a number of projections 142 (FIG. 14) which are located respectively laterally aligned with the vertical grooves or recesses 66 in the side wall 54.

The blank 130 thus configured is mounted on the first longitudinal segment 52 in such a manner that the individual elongated portions 132 thereof are respectively received each in part in the vertical grooves or recesses 66 in the side wall 54 and at the same time the projections 142 on the inner side edge 76 of the bottom wall 60 of the segment 52 are respectively fitted into the apertures 140 in the individual elongated portions 132 of the blank 130. As will be seen from FIGS. 13 and 14, the blank 130 thus carried on the first longitudinal segment 52 has its first and second longitudinal strip portions 134 and 136 and lower portions of its elongated portions 132 projecting downwardly from the lower end of the bottom wall 60 of the first longitudinal segment 52. The second longitudinal segment 52' is then fitted and bonded to the first longitudinal segment in a manner substantially similar to that previously described with regard to the embodiment illustrated in FIGS. 2 and 3. The section of the blank 130 comprised of the first and second longitudinal strip portions 134 and 136 and the strip portions 138 interconnecting the longitudinal strip portions 134 and 136 is thereafter severed from the lowermost ends of the elongated portions 132 of the blank 130. Each of the elongated portions 132 of the initial blank 130 thus constitutes a contact element 68 having a turned upper end portion 68*a* located within the elongated groove between the side walls 54 and 54' of the first and second longitudinal segments 52 and 52', an intermediate portion 68*b* received in each of the vertical grooves or recesses 66 in the side wall 54 of the first longitudinal segment 52, and a lower end portion or limb 68*c* projecting downwardly from the outer face of the combined bottom walls 60 and 60' of the segments 52 and 52' through the slot or apertures formed by the elongated recess or spaced recesses 70 in the inner side edge of the bottom wall portion 60' of the second longitudinal segment 52'.

From the foregoing description it will now be appreciated that the connector assembly produced in accordance with the present invention from segments which are initially separate from each otheris adapted to be manufactured by an automated in-line operation including the steps of punching and bending the contact elements, forming the component segments of the assembly and conjoining the segments together and mounting the resultant housing structure on a mother board. The present invention is, therefore, expected to contribute to reducing the number of steps for production, standardizing the production schemes, and providing assurance of quality control especially where the connector assembly is to be produced on a large-scaled commercial basis.

What is claimed is:

1. A method of manufacturing a connector assembly for a printed wiring board, comprising the steps of forming first and second segments which are to constitute in combination a housing structure having a pair of spaced parallel side walls forming therebetween an elongated groove having an open top end, end walls located at the opposite longitudinal ends of said elongated groove and a bottom wall located at the bottom of said elongated groove and formed with at least one opening which is arranged substantially in parallel with the inner faces of said side walls, said first and second segments having respective inner side edges which are to be in contact with each other when the segments are assembled together into the housing structure and each of said side edges having a longitudinal portion to constitute part of the bottom wall of the housing structure and a pair of vertical portions each of which is to constitute part of each of the end walls of the housing structure; forming a unitary blank of conductive material having a plurality of spaced parallel elongated portions and at least one longitudinal strip portion with which said elongated portions are integral in their respective portions to project outwardly from said bottom wall of said housing structure; positioning said blank on at least one of said first and second segments so that said elongated portions are each in part carried on the inner face of that portion of at least one of the segments which is to form at least one of said side walls of the housing structure, said longitudinal portion being located below said longitudinal portions of the side edge of the segment on which the blank is carried; positioning the first and second segments relative to each other so that said side edges of the segments are in contact with each other with said elongated portions of said blank projecting each inpart outwardly from the longitudinal portions of said edges; inseparably assembling the segments together along said side edges for forming said housing structure; and severing said longitudinal strip portion of said blank from said elongated portions so that the elongated portions are separate from each other and form contact elements.

2. A method as set forth in claim 1, in which said segment to carry said contact elements thereon has formed on said longitudinal portion of said inner side edge thereof a plurality of projections respectively disposed in alignment with the contact elements on the inner face of said at least one of the side walls and in which said blank has formed in said elongated portions thereof apertures respectively aligned with said projections, said blank being positioned on said at least one of the side walls with said projections respectively received in said apertures.

3. A method as set forth in claim 1, in which said inner side edges of said first and second segments are joined together with a straight halved joint formed in their respective portions to form each of said end walls of said housing structure.

4. A method as set forth in claim 1, in which said inner side edges of said first and second segments are joined together with a forked-mortice-and-tenon joint formed in their respective portions to form each of said end walls of said housing structure.

5. A method as set forth in claim 1, in which one of said first and second segments has at least one projection formed on said inner side edge thereof and the other of said first and second segments has formed in said inner side edge thereof at least one recess located to be in alignment with said projection when the two segments are to be assembled, said first and second segments being conjoined together with said projection fitted into said recess.

6. A method as set forth in claim 1, in which said housing structure is further constituted by a third segment formed with an elongated slot which is shaped conformingly to the external contour, on a plane parallel with the inner face of the bottom wall of the housing structure to be constructed, of the combination of said first and second segments, said combination of said first and second segments being closely received in said elongated slot when conjoined to said third segment.

7. A method as set forth in claim 1, in which said segments are conjoined by an adhesive.

8. A method as set forth in claim 1, in which said segments are conjoined by ultrasonic welding.

* * * * *